Patented Nov. 3, 1925.

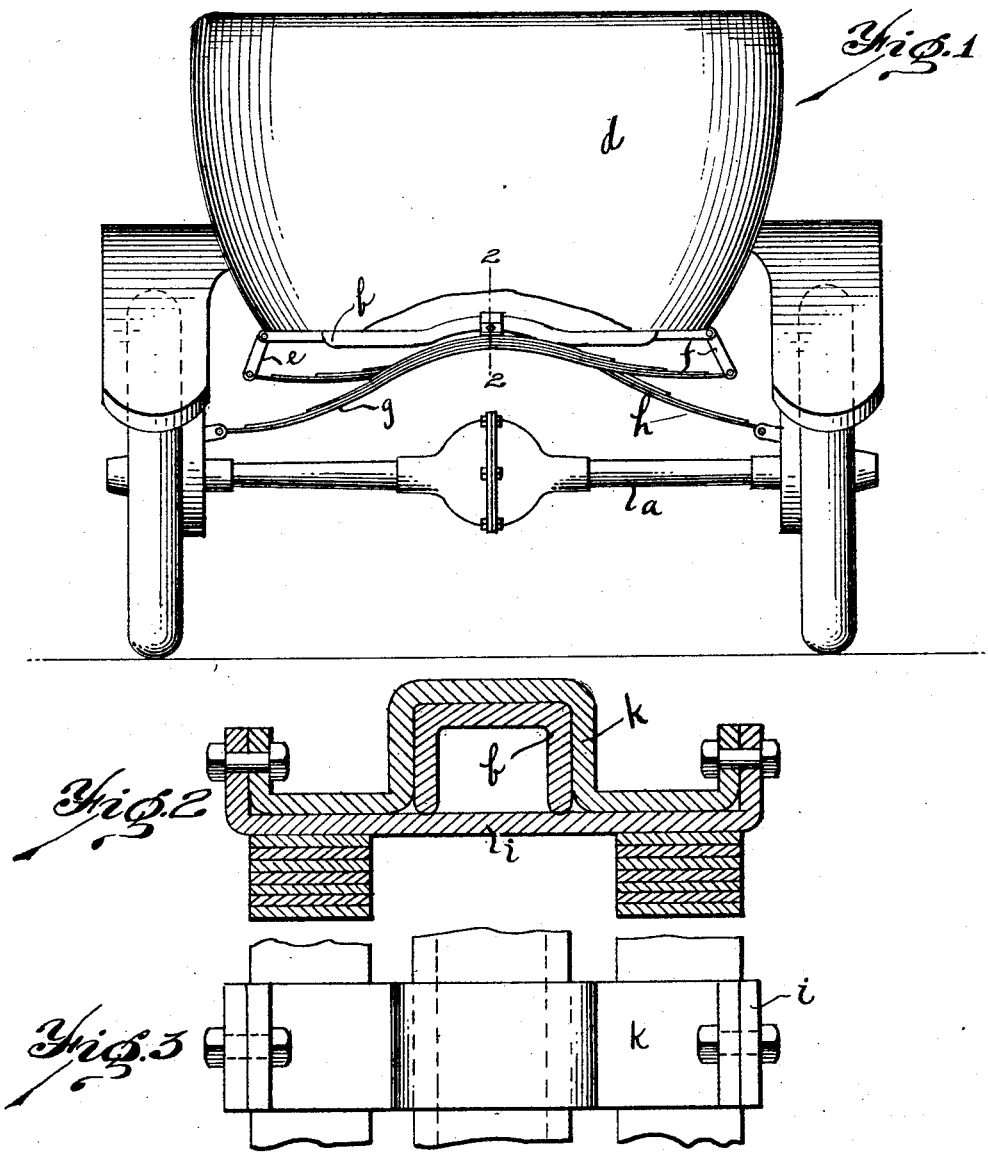

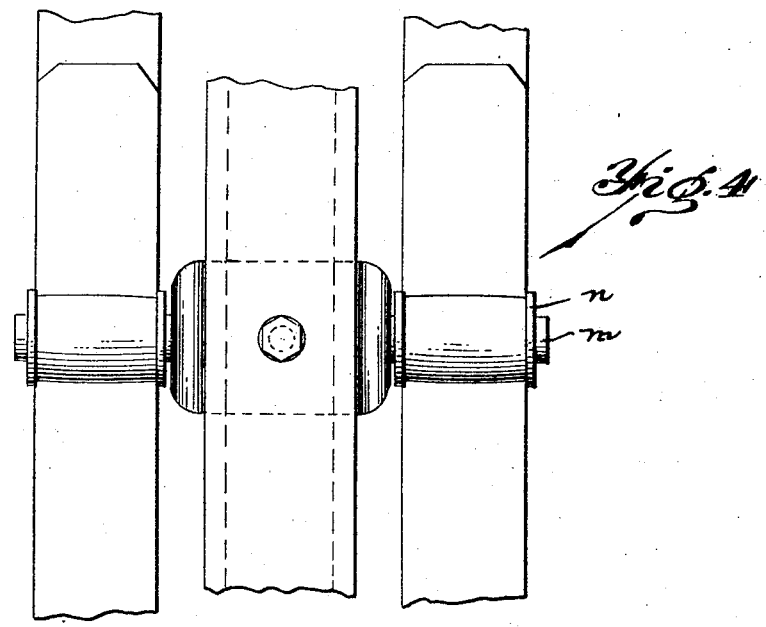
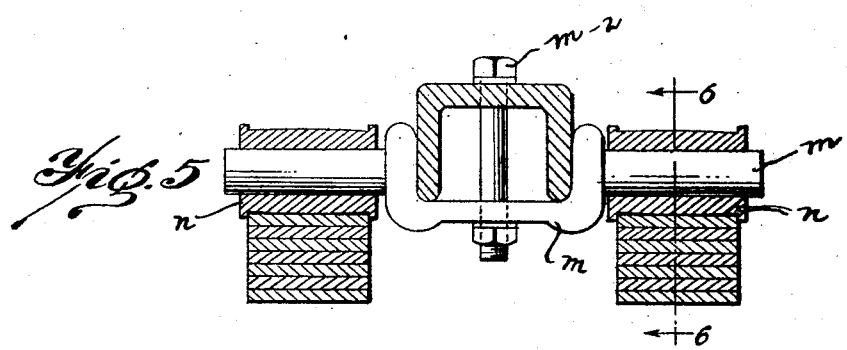
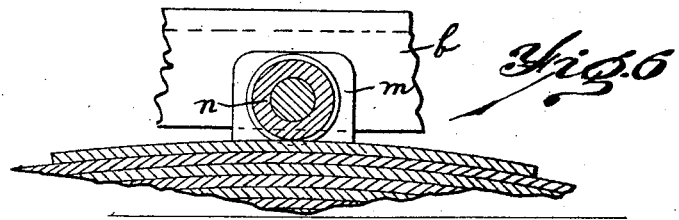

1,559,852

UNITED STATES PATENT OFFICE.

FRANK V. COOKE, OF HIGHLAND PARK, MICHIGAN, ASSIGNOR TO KARL B. GODDARD, OF DETROIT, MICHIGAN.

RESILIENT SUSPENSION OF VEHICLE BODIES.

Application filed January 28, 1921. Serial No. 440,553.

*To all whom it may concern:*

Be it known that I, FRANK V. COOKE, citizen of the United States, residing at Highland Park, county of Wayne, State of Michigan, have invented a certain new and useful Improvement in Resilient Suspensions of Vehicle Bodies, and declare the following to be a full, clear, and exact description of the same, such as will enable others skilled in the art to which it pertains to make and use the same, reference being had to the accompanying drawings, which form a part of this specification.

My invention relates to an improvement in the resilient suspension of vehicle bodies and is shown as embodied in the suspension for the rear end of an automobile chassis.

This invention is an improvement on the invention described in my Patent No. 1,344,792 dated June 29th, 1920. In the structure shown in the drawing of said patent the body supporting member is in the form of a fork positioned above the springs but resting thereon at their intermediate section where they cross each other so that the body load will be carried by the springs through this intermediate supporting member. The contact formed between the springs and this supporting member, which supporting member serves as a fulcrum for each spring, is of such a character that each spring will be permitted individual longitudinal movement over said fulcrum point.

The construction shown in said drawing however exhibits a forked supporting member which embraces each spring at such fulcrum point so that though the free longitudinal movement of the spring would be permitted, the lateral movement of the spring would be exceedingly limited if not altogether completely restrained. The broad application of this particular construction is claimed in the reissue application above referred to but in the above mentioned patent the claims are limited to a device adapted to restrain lateral distortion. The broad construction herein shown possesses distinctive merit over the claimed constructions above referred to.

The structure shown in the above patent is the preferred form of body suspension for motor vehicles of the heavy or medium weight type under average road conditions. A forked supporting member shaped as therein shown, it will be evident, prevents within narrow limits lateral movement and flexion of the springs and imparts very considerable rigidity to the suspension except in a vertical direction. In the larger type of vehicles, especially when used over rough roads, such rigidity is essential to prevent the breaking of the springs by the torsion produced by the lateral flexion in order that the springs may be held in line. Particularly, however, to prevent over stressing of the springs in a lateral direction it is necessary that means be provided for restraining this lateral distortion. It is also necessary to provide sufficient rigidity of body suspension.

In using this type of body suspension on light cars such as Fords, the inherent structure of the springs themselves and the rigidity of the connections formed between the axle and the body by the springs is such as to fulfill all the practical requirements. It is also desirable to permit horizontal or lateral flexion or movement of the springs either unreservedly or within certain limits by permitting relative lateral movement of the springs at their crossing point relative the body supporting member which serves as a bearing therefor.

Accordingly, the object of this invention is the provision of a preferred form of construction in which the lateral movement of the springs relative the body supporting member will not be restrained. A secondary form of construction is shown in which this lateral movement is partially limited or restrained.

The above and other objects of the invention including details of construction and combinations of parts will be apparent from the following description of an illustrative embodiment of the invention as shown in the accompanying drawings, in which:

Figure 1 is a rear elevation of my device secured to the rear axle of a Ford car.

Fig. 2 is a vertical cross-section taken on line 2—2 of Fig. 1.

Fig. 3 is a plan of the fragment shown in Fig. 2.

Fig. 4 is a top plan view of a modified form of my device.

Fig. 5 is a cross-section of such modified form.

Fig. 6 is a section taken on the line 6—6 of Fig. 5.

In the drawings, let $a$ indicate the axle and $b$ the body or cross rear frame member here shown as the cross rear frame member found in the Ford chassis. $d$ is the body carried by such frame. Depending from opposite ends of the frame member $b$ are toggle connections or shackles $e$ and $f$.

Resilient support is provided for the frame by means of cross springs connected to the ends of the axle and connected at respectively opposite ends to the opposite side of the frame member or body. These springs cross each other at approximately the middle point of the body and a body supporting member is provided at such point adapted to serve as a bearing fulcrum for said springs. Spring $g$ is connected at one end to the brake-drum carried at one end of the axle housing and crosses underneath the body and is shackled to the opposite side of the frame member $b$ by means of shackle $f$. Spring $h$ is connected at one end to the brake-drum carried at the opposite end of the axle and the other end of the spring is connected to the further side of the body frame member $b$ by means of shackle $e$.

The body load is carried on the springs by means of a body supporting member adapted to rest on the upper surface of the springs forming a fulcrum bearing for each spring. As embodied in Figs. 1, 2 and 3 of the drawing this body supporting member consists of a bearing plate $i$ strapped to the cross-frame member $b$ by means of a strap $k$ bolted together as shown in the drawing. It is evident that this bearing plate might be secured to the body in any convenient fashion other than that shown so long as it formed a bearing fulcrum for each spring so that the body load would be carried thereby. This particular form of construction is particularly adapted to permit free lateral flexion of the springs relative the body supporting member as well as movement of the springs longitudinally relative said supporting member. It is also apparent that the vertical movement of the springs is unrestrained except in so far as limited by the bearing fulcrum member resting thereon.

A modified form of construction is shown in Figs. 4, 5 and 6 in which the body supporting member is provided with a roller or spool bearing for each spring. A bracket $m$ is secured to the cross frame member $b$ as shown in Fig. 5 by means of a bolt $n^2$. The ends of this bracket extend outwardly from the cross frame member, each extending end carrying a freely rotatable spool $n$. It will be noted that the spool is unrestrained on its mounting but as the permitted movement of each spring laterally would be limited and as the spindle $m$ extends beyond the end of the spool, the spool would not run off the spindle on which it is mounted. In this type of construction the downwardly projecting center of the member $m$ serves to restrain the lateral movement of the springs toward each other though the horizontal flexion is otherwise unrestrained.

What I claim is:

1. In a resilient suspension for a vehicle, in combination, a load-supporting member, an axle below said member and normally approximately parallel thereto, springs pivotally connected to the ends of the axle and connected to the respectively opposite sides of the load-supporting member by toggle connections permitting movement of the ends of the springs relatively to the load-supporting member and in a direction longitudinally of the springs, whereby the springs cross below the load-supporting member, and a bearing for the upper surfaces of the crossing of the springs permitting movement of the springs relative the bearing longitudinally and laterally of the springs, and providing a fulcrum for said crossing to co-operate with the toggle connections at the upper ends of the springs to bring about the necessary vertical flexion of the springs to secure resilient support of the load-supporting member as the vehicle passes over uneven surfaces.

2. In resilient suspension for a vehicle, in combination an axle, a load-supporting member above the axle and normally approximately parallel thereto, springs connected to the ends of the axle and to the respectively opposite ends of the load-supporting member crossing each other between said axle and load-supporting member, a rigid fulcrum member carried by the load-supporting member bearing on the upper surface of said springs to permit free movement of said springs longitudinally and laterally thereover.

3. In resilient suspension for a motor vehicle, the combination of an axle, a channel frame member above said axle and extending normally parallel thereto, a spring shackled to one end of said frame member and secured to the end of the axle farthest therefrom, a second spring shackled at the opposite end of said frame member and secured to the end of the axle farthest therefrom, said springs crossing each other between the axle and frame member, a rigid fulcrum having a flat bearing face carried by said frame member and bearing upon the upper surface of said springs at their crossing point, so that the body load will be carried thereby, engaging said springs in such a manner as to permit free longitudinal and lateral movement of the springs thereover.

4. In vehicle suspension, a frame member, an axle, a spring secured to the frame member and to the end of the axle furthest therefrom, a second spring secured to the frame member and to the opposite end of the axle, said springs crossing each other, a fulcrum bearing on said springs at their crossing points in such a manner as to permit the springs to travel longitudinally and laterally thereover.

5. In vehicle suspension, a vehicle body, an axle, a spring secured to one side of the body and to the opposite end of the axle, a second spring secured to the other side of the body and the other end of the axle and crossing the first spring member, a fulcrum member carried by the body bearing on said springs to permit independent travel of the springs laterally and longitudinally thereover.

6. In vehicle suspension, a vehicle body, an axle, a spring shackled to one side of the body and the end of the axle furthest therefrom, a second spring shackled to the other side of the body and to the opposite end of the axle and crossing the first spring member, a fulcrum member carried by the body bearing on the upper surface of said springs and adapted to permit each spring to travel longitudinally and laterally thereover.

In testimony whereof I sign this specification.

FRANK V. COOKE.